(12) United States Patent
Bulusu et al.

(10) Patent No.: US 12,450,549 B1
(45) Date of Patent: Oct. 21, 2025

(54) BAYESIAN AND FREQUENTIST ANOMALY DETECTION ENSEMBLE

(71) Applicant: Blue Yonder Group, Inc., Scottsdale, AZ (US)

(72) Inventors: Phani Mitra Bulusu, Bangalore (IN); Rashid Puthiyapurayil, Bangalore (IN); Vidhi Chugh, Delhi (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

(21) Appl. No.: 17/747,768

(22) Filed: May 18, 2022

Related U.S. Application Data

(60) Provisional application No. 63/190,420, filed on May 19, 2021.

(51) Int. Cl.
*G06Q 10/0833* (2023.01)
*G06N 7/01* (2023.01)

(52) U.S. Cl.
CPC ........... *G06Q 10/0833* (2013.01); *G06N 7/01* (2023.01)

(58) Field of Classification Search
CPC ............. G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS

2022/0253763 A1\* 8/2022 Dividino ............ G06Q 10/0635

OTHER PUBLICATIONS

Zhao, Zhiruo. Ensemble methods for anomaly detection. Diss. Syracuse University, 2017. (Year: 2017).\*

\* cited by examiner

*Primary Examiner* — Emmett K. Walsh
(74) *Attorney, Agent, or Firm* — Spencer Fane LLP; Steven J. Laureanti

(57) ABSTRACT

A system and method are disclosed for applying machine learning to identify anomalous supply chain data that generates a probabilistic graphical model based on training data from historical attributes of a supply chain comprising supply chain entities to represent the performance of the supply chain entities in the supply chain, standardizes input features data related to the probabilistic graphical model, performs data anomaly detection within the probabilistic graphical model using one or more frequentist data anomaly detection algorithms, performs data anomaly detection within the probabilistic graphical model using one or more Bayesian data anomaly detection algorithms, combines according to one or more weighting methods, the data anomaly detection performed using one or more frequentist data anomaly detection algorithms with the data anomaly detection performed using one or more Bayesian data anomaly detection algorithms, and detects in response to the combining, an anomaly within the standardized input features data.

20 Claims, 4 Drawing Sheets

BAYESIAN AND FREQUENTIST ANOMALY DETECTION ENSEMBLE

CROSS-REFERENCE TO RELATED APPLICATIONS

The present disclosure is related to that disclosed in the U.S. Provisional Application No. 63/190,420, filed May 19, 2021, entitled "Bayesian and Frequentist Anomaly Detection Ensemble." U.S. Provisional Application No. 63/190,420 is assigned to the assignee of the present application. The present invention hereby claims priority under 35 U.S.C. § 119(e) to U.S. Provisional Application No. 63/190,420.

TECHNICAL FIELD

The present disclosure relates generally to supply chain planning and specifically to utilizing probabilistic graphical models and frequentist approaches to detect anomalies in data.

BACKGROUND

Supply chain machine learning systems may generate one or more models to model the flow of materials through one or more supply chain networks and the individual entities, such as manufacturers, suppliers, retailers, and transportation hubs, which comprise supply chain networks. Supply chain machine learning systems may also access and/or may generate vast quantities of data, which may contain data anomalies comprising improperly entered data, improperly converted data formats, faulty data, corrupted data, and/or any other type of distorted or incorrect data. Supply chain machine learning systems may rely on frequentist data analysis algorithms to detect data anomalies, which may result in good performance over large data sets. Bayesian data analysis algorithms are frequently used in other domains due to their good performance when prior information for is available. However, existing supply chain machine learning systems fail to take advantage of Bayesian data analysis algorithms for data anomaly detection, and further, existing supply chain machine learning systems are unable to combine the use frequentist and Bayesian approaches to gain the benefits of both approaches, both of which are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
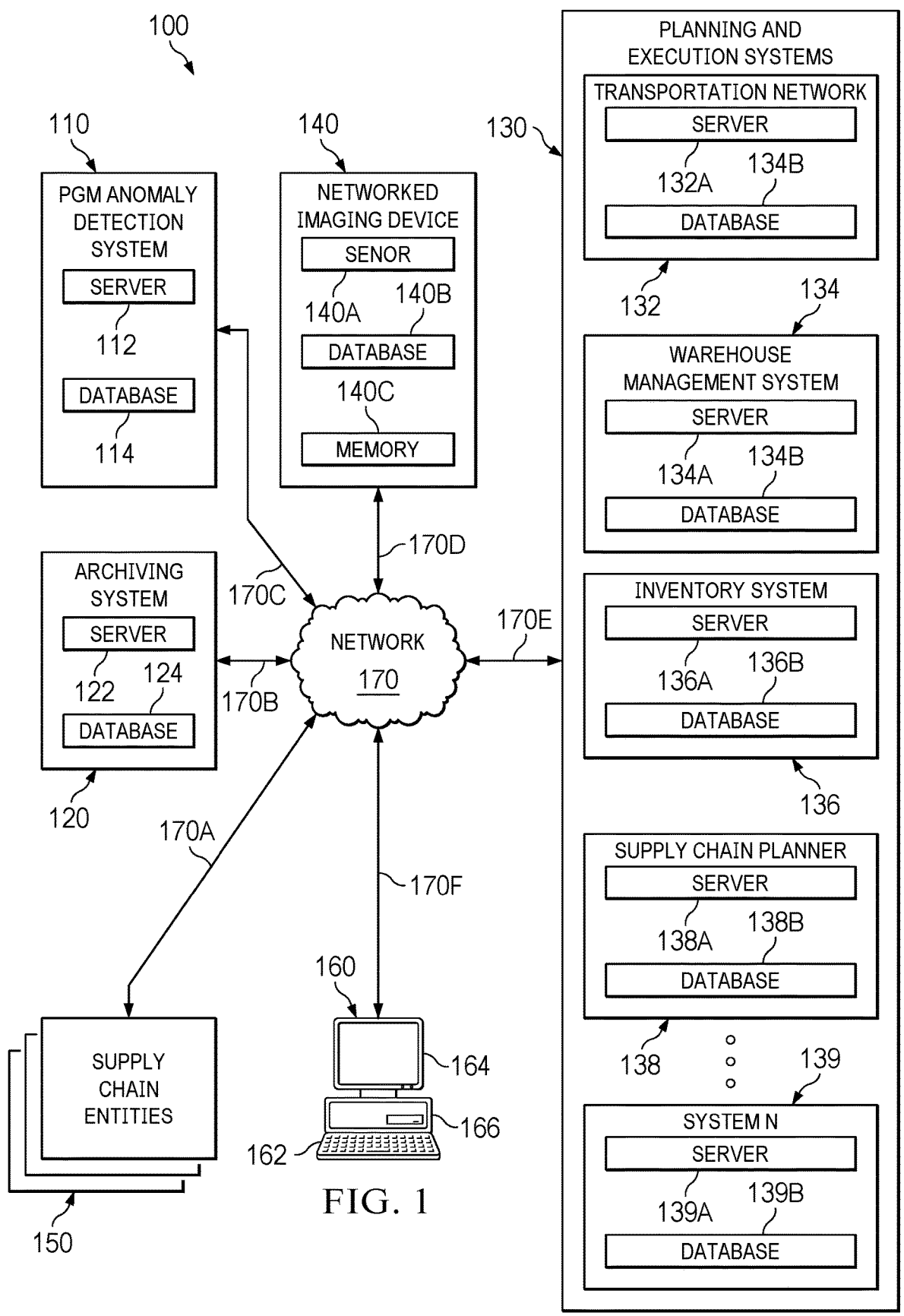
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Embodiments of the following disclosure provide a probabilistic graphical model (PGM) resolution system and method to detect data anomalies using a weighted combination of frequentist and Bayesian data anomaly detection algorithms. Embodiments comprise a PGM anomaly detection system that generates PGMs and identifies probability relationships within quantities modeled by the PGMs. Embodiments use one or more frequentist algorithms to detect and identify data anomalies, and separately use one or more Bayesian algorithms to also detect and identify data anomalies. Embodiments combine the results of the one or more frequentist algorithms and the one or more Bayesian algorithms using one or more weighting methods to generate a final analysis of data anomalies.

Embodiments of the following disclosure generate one or more PGM networks, including one or more Bayesian PGM networks, and draw from the PGM networks and associated Bayesian data anomaly detection algorithms to detect and identify data anomalies. Embodiments combine these results with anomaly detection data generated by frequentist data anomaly detection algorithms to leverage the strength of both Bayesian and frequentist algorithms, weighted by one of several weighting methods including but not limited to majority weighting or Jaccard similarity weighting, to quickly and efficiently locate data anomalies with high accuracy.

FIG. 1 illustrates supply chain network 100, in accordance with a first embodiment. Supply chain network 100 comprises probabilistic graphical model (PGM) anomaly detection system 110, archiving system 120, one or more planning and execution systems 130, networked imaging device 140, one or more supply chain entities 150, computer 160, network 170, and one or more communication links 170A-F. Although a single PGM anomaly detection system 110, a single archiving system 120, one or more planning and execution systems 130, a single networked imaging device 140, one or more supply chain entities 150, a single computer 160, a single network 170, and one or more communication links 170A-F are illustrated and described, embodiments contemplate any number of PGM anomaly detection systems 110, archiving systems 120, supply chain planning and execution systems 130, networked imaging devices 140, supply chain entities 150, computers 160, networks 170, or communication links 170a-f, according to particular needs.

In one embodiment, PGM anomaly detection system 110 comprises server 112 and database 114. Server 112 comprises one or more modules that model supply chain network 100 and build probabilistic graphical models of supply chain attributes, as well as detecting data anomalies using frequentist and Bayesian processes, as described in greater detail below.

Archiving system 120 of supply chain network 100 comprises server 122 and database 124. Although archiving system 120 is illustrated as comprising a single server 122 and a single database 124, embodiments contemplate any suitable number of servers or databases internal to or externally coupled with archiving system 120. Server 122 may support one or more processes for receiving and storing data from one or more planning and execution systems 130, networked imaging device 140, one or more supply chain entities 150, and/or computer 160 of supply chain network 100. According to some embodiments, archiving system 120 comprises an archive of data received from one or more planning and execution systems 130, networked imaging device 140, one or more supply chain entities 150, and/or computer 160 of supply chain network 100. Archiving system 120 provides archived data to PGM anomaly detection system 110 and one or more planning and execution systems 130 to, for example, train one or more machine learning models. Server 122 may store the received data in database 124. Database 124 may comprise one or more databases or other data storage arrangements at one or more locations, local to, or remote from, the server.

One or more planning and execution systems 130 of supply chain network 100 comprise transportation network 132, warehouse management system 134, inventory system 136, supply chain planner 138, and any number of one or more other planning and execution systems 139. Although one or more planning and execution systems 130 are illustrated and described as comprising a single transportation network 132, a single warehouse management system 134, a single inventory system 136, and a single supply chain planner 138, embodiments contemplate any number or combination of one or more planning and execution systems 130 located internal to, or remote from, supply chain network 100, according to particular needs. For example, planning and execution systems 130 typically perform several distinct and dissimilar processes, including, for example, assortment planning, demand planning, operations planning, production planning, supply planning, distribution planning, execution, forecasting, transportation management, warehouse management, inventory management, fulfilment, procurement, and the like. Servers 132A-139A of one or more planning and execution systems 130 comprise one or more modules, such as, for example, a planning module, a solver, a modeler, and/or an engine, for performing activities of one or more planning and execution processes.

Servers 132A-139A of one or more planning and execution systems 130 stores and retrieves data from databases 132B-139B or from one or more locations in supply chain network 100. In addition, one or more planning and execution systems 130 operate on one or more computers that are integral to, or separate from, the hardware and/or software that support PGM anomaly detection system 110, archiving system 120, networked imaging device 140, or one or more supply chain entities 150.

By way of example only and not by way of limitation, one or more planning and execution systems 130 may include transportation network 132. Transportation network 132 comprises server 132A and database 132B. According to embodiments, transportation network 132 directs one or more transportation vehicles to ship one or more items between one or more supply chain entities 150, based, at least in part, on a supply chain plan, including a supply chain master plan, the number of items currently in stock at one or more supply chain entities 150 or other stocking location, the number of items currently in transit in transportation network 132, a forecasted demand, a supply chain disruption, and/or one or more other factors described herein. One or more transportation vehicles comprise, for example, any number of trucks, cars, vans, boats, airplanes, unmanned aerial vehicles (UAVs), cranes, robotic machinery, or the like. The one or more transportation vehicles may comprise radio, satellite, or other communication that communicates location information (such as, for example, geographic coordinates, distance from a location, global positioning satellite (GPS) information, or the like) with PGM anomaly detection system 110, archiving system 120, one or more planning and execution systems 130, networked imaging device 140, and/or one or more supply chain entities 150 to identify the location of the one or more transportation vehicles and the location of any inventory or shipment located on the one or more transportation vehicles.

By way of a further example only and not by way of limitation, one or more planning and execution systems 130 include warehouse management system 134. According to embodiments, server 134A comprises one or more modules that manage and operate warehouse operations, plan timing and identity of shipments, generate picklists, packing plans, and instructions. Warehouse management system 134 instructs users and/or automated machinery to obtain picked items and generates instructions to guide placement of items on a picklist in the configuration and layout determined by a packing plan. For example, the instructions may instruct a user and/or automated machinery to prepare items on a picklist for shipment by obtaining the items from inventory or a staging area and packing the items on a pallet in a proper configuration for shipment. Embodiments contemplate warehouse management system 134 determining routing, packing, or placement of any item, package, or container into any packing area, including, packing any item, package, or container in another item, package, or container. Warehouse management system 134 may generate instructions for packing products into boxes, packing boxes onto pallets, packing loaded pallets into trucks, or placing any item, container, or package in a packing area, such as, for example, a box, a pallet, a shipping container, a transportation vehicle, a shelf, a designated location in a warehouse (such as a staging area), and the like.

In addition, or as an alternative, one or more planning and execution systems 130 comprise or are operably coupled with inventory system 136. Server 136A of inventory system 136 is configured to receive and transmit item data, including item identifiers, pricing data, attribute data, inventory levels, and other like data about one or more items at one or more stocking locations in supply chain network 100. Server 136A stores and retrieves item data from database 136B or from one or more locations in supply chain network 100.

As disclosed above, one or more planning and execution systems 130 may include supply chain planner 138. Supply chain planner 138 may model and solve supply chain planning problems (such as, for example, operation planning problems). Supply chain planner 138 generates the supply chain planning problem solutions, which are used by PGM anomaly detection system 110 to construct training data. In one embodiment, supply chain planner 138 may use a probabilistic graphical model to predict target supply chain attributes needed to reach a target state of the supply chain, or other predicted supply chain information or status, as described in further detail below.

Networked imaging device 140 comprises processor 140B, memory 140C, sensor 140A, and may include any suitable input device, output device, fixed or removable computer-readable storage media, or the like. According to embodiments, networked imaging device 140 comprises an electronic device that receives imaging data from sensor 140A or from one or more databases in supply chain network 100. Sensor 140A may comprise an imaging sensor, such as, a camera, scanner, electronic eye, photodiode, charged coupled device (CCD), or any other electronic component that detects visual characteristics (such as color, shape, size, fill level, or the like) of objects. Networked imaging device 140 may comprise, for example, a mobile handheld electronic device such as, for example, a smartphone, a tablet computer, a wireless communication device, and/or one or more networked electronic devices configured to image items using the one or more sensors and transmit product images to one or more databases.

In addition, or as an alternative, sensor 140A may comprise a radio receiver and/or transmitter configured to read an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or like objects that encode identifying information. Networked imaging device 140 may generate a mapping of one or more items in supply chain network 100 by scanning an identifier or object associated with an item and identifying the item based, at least in part, on the scan. This may include, for example, a stationary scanner located at one or more supply chain entities 150 that scans items as the items pass near the scanner. In an embodiment, PGM anomaly detection system 110, archiving system 120, one or more planning and execution systems 130, networked imaging device 140, and/or one or more supply chain entities 150 may use the mapping of an item to locate the item in supply chain network 100. The location of the item may be used to coordinate the storage and transportation of items in supply chain network 100 according to one or more plans and/or a reallocation of materials or capacity generated by one or more planning and execution systems 130. Plans may comprise one or more of a master supply chain plan, production plan, operations plan, distribution plan, and the like.

In addition, sensor 140A may be located at one or more locations local to, or remote from, networked imaging device 140, including, for example, sensors 140A integrated into networked imaging device 140 or sensor 140A remotely located from, but communicatively coupled with, networked imaging device 140. According to some embodiments, sensor 140A may be configured to communicate directly or indirectly with one or more of PGM anomaly detection system 110, archiving system 120, one or more planning and execution systems 130, networked imaging device 140, one or more supply chain entities 150, computer 160, and/or network 170 using one or more communication links 170A-F.

One or more supply chain entities 150 may represent one or more suppliers, manufacturers, distribution centers, and retailers in one or more supply chain networks, such as supply chain network 100, including one or more enterprises. One or more suppliers may be any suitable entity that offers to sell or otherwise provides one or more components to one or more manufacturers. One or more suppliers may, for example, receive a product from a first supply chain entity 150 in supply chain network 100 and provide the product to another supply chain entity 150. One or more suppliers may comprise automated distribution systems that automatically transport products to one or more manufacturers based, at least in part, on a supply chain plan, the number of items currently in stock at one or more supply chain entities 150, the number of items currently in transit in transportation network 132, a forecasted demand, a supply chain disruption, a material or capacity reallocation, current and projected inventory levels at one or more stocking locations, and/or one or more additional factors described herein.

A manufacturer may be any suitable entity that manufactures at least one product. A manufacturer may use one or more items during the manufacturing process to produce any manufactured, fabricated, assembled, or otherwise processed item, material, component, good or product. Items may comprise, for example, components, materials, products, parts, supplies, or other items, that may be used to produce products. In addition, or as an alternative, an item may comprise a supply or resource that is used to manufacture the item, but does not become a part of the item. In one embodiment, a product represents an item ready to be supplied to, for example, another supply chain entity, such as a supplier, an item that needs further processing, or any other item. A manufacturer may, for example, produce and sell a product to a supplier, another manufacturer, a distribution center, a retailer, a customer, or any other suitable person or an entity. Such manufacturers may comprise automated robotic production machinery that produce products based, at least in part, on a supply chain plan, the number of items currently in stock at one or more supply chain entities 150, the number of items currently in transit in transportation network 132, a forecasted demand, a supply chain disruption, a material or capacity reallocation, current and projected inventory levels at one or more stocking locations, and/or one or more additional factors described herein.

One or more distribution centers may be any suitable entity that offers to sell or otherwise distributes at least one product to one or more retailers and/or customers. Distribution centers may, for example, receive a product from a first supply chain entity 150 in supply chain network 100 and store and transport the product for a second supply chain entity 150. Such distribution centers may comprise automated warehousing systems that automatically transport to one or more retailers or customers and/or automatically remove an item from, or place an item into, inventory based, at least in part, on a supply chain plan, the number of items currently in stock at one or more supply chain entities 150, the number of items currently in transit in transportation network 132, a forecasted demand, a supply chain disruption, a material or capacity reallocation, current and projected inventory levels at one or more stocking locations, and/or one or more additional factors described herein.

One or more retailers may be any suitable entity that obtains one or more products to sell to one or more customers. In addition, one or more retailers may sell, store, and supply one or more components and/or repair a product with one or more components. One or more retailers may comprise any online or brick and mortar location, including locations with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location, and which may be based, at least in part, on a supply chain plan, the number of items currently in stock at one or more supply chain entities 150, the number of items currently in transit in transportation network 132, a forecasted demand, a supply chain disruption, a material or capacity reallocation, current and projected inventory levels at one or more stocking locations, and/or one or more additional factors described herein.

Although one or more suppliers, manufacturers, distribution centers, and retailers are illustrated and described as separate and distinct entities, the same entity may simultaneously act as any one or more suppliers, manufacturers, distribution centers, and retailers. For example, one or more manufacturers acting as a manufacturer could produce a product, and the same entity could act as a supplier to supply a product to another supply chain entity 150. Although one example of supply chain network 100 is illustrated and described, embodiments contemplate any configuration of supply chain network 100, without departing from the scope of the present disclosure.

As illustrated by FIG. 1, supply chain network 100 comprising PGM anomaly detection system 110, archiving system 120, one or more planning and execution systems 130, networked imaging device 140, and one or more supply chain entities 150 may operate on one or more computers 160 that are integral to or separate from the hardware and/or software that support PGM anomaly detection system 110, archiving system 120, one or more planning and execution systems 130, networked imaging device 140, and one or more supply chain entities 150. One or more computers 160 may include any suitable input device 162, such as a keypad, mouse, touch screen, microphone, or other device to input information. One or more computers 160 may also comprise one or more output devices 164, including but not limited to one or more computer monitors, which may convey information associated with the operation of supply chain network 100, including digital or analog data, visual information, or audio information.

One or more computers 160 may include fixed or removable computer-readable storage media, including a non-transitory computer readable medium, magnetic computer disks, flash drives, CD-ROM, in-memory devices or other suitable media to receive output from and provide input to the supply chain network 100. One or more computers 160 may include one or more processors 166 and associated memory to execute instructions and manipulate information according to the operation of supply chain network 100 and any of the methods described herein. In addition, or as an alternative, embodiments contemplate executing the instructions on one or more computers 160 that cause one or more computers 160 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible computer-readable media that have computer-readable instructions encoded thereon, and the instructions may comprise instructions to perform functions of the methods described herein.

PGM anomaly detection system 110, archiving system 120, one or more planning and execution systems 130, networked imaging device 140, and one or more supply chain entities 150 may each operate on one or more separate computers 160, a network of one or more separate or collective computers, or may operate on one or more shared computers. In addition, supply chain network 100 may comprise a cloud-based computing system having processing and storage devices at one or more locations, local to, or remote from PGM anomaly detection system 110, archiving system 120, one or more planning and execution systems 130, networked imaging device 140, and one or more supply chain entities 150. In addition, each of one or more computers 160 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with PGM anomaly detection system 110, archiving system 120, one or more planning and execution systems 130, networked imaging device 140, and one or more supply chain entities 150.

These one or more users may include, for example, a "manager" or a "planner" handling supply chain planning, training PGM anomaly detection system 110, and/or one or more related tasks within supply chain network 100. In addition, or as an alternative, these one or more users within supply chain network 100 may include, for example, one or more computers 160 programmed to autonomously handle, among other things, production planning, demand planning, option planning, sales and operations planning, operation planning, supply chain master planning, plan adjustment after supply chain disruptions, order placement, automated warehouse operations (including removing items from and placing items in inventory), robotic production machinery (including producing items), and/or one or more related tasks within the supply chain network 100.

In one embodiment, PGM anomaly detection system 110 may be coupled with network 170 using communications link 170C, which may be any wireline, wireless, or other link suitable to support data communications between PGM anomaly detection system 110 and network 170 during operation of supply chain network 100. Archiving system 120 may be coupled with network 170 using communications link 170B, which may be any wireline, wireless, or other link suitable to support data communications between archiving system 120 and network 170 during operation of supply chain network 100. One or more planning and executions systems 130 may be coupled with network 170 using communications link 170E, which may be any wireline, wireless, or other link suitable to support data communications between one or more planning and executions systems 130 and network 170 during operation of supply chain network 100. Networked imaging device 140 is coupled with network 170 using communications link 170D, which may be any wireline, wireless, or other link suitable to support data communications between networked imaging device 140 and network 170 during operation of supply chain network 100. One or more supply chain entities 150 may be coupled with network 170 using communications link 170A, which may be any wireline, wireless, or other link suitable to support data communications between one or more supply chain entities 150 and network 170 during operation of supply chain network 100. One or more computers 160 may be coupled with network 170 using communications link 170F, which may be any wireline, wireless, or other link suitable to support data communications between computer 160 and network 170 during operation of supply chain network 100.

Although communication links 170A-F are illustrated as generally coupling PGM anomaly detection system 110, archiving system 120, one or more planning and execution systems 130, networked imaging device 140, one or more supply chain entities 150, and computer 160 to the network, each of PGM anomaly detection system 110, archiving system 120, one or more planning and execution systems 130, networked imaging device 140, one or more supply chain entities 150, and computer 160 may communicate directly with each other, according to particular needs.

In another embodiment, network 170 includes the Internet and any appropriate local area networks (LANs), metropolitan area networks (MANs), or wide area networks (WANs) coupling PGM anomaly detection system 110, archiving system 120, one or more planning and execution systems 130, networked imaging device 140, one or more supply chain entities 150, and computer 160. For example, data may be maintained locally or externally of PGM anomaly detection system 110, archiving system 120, one or more planning and execution systems 130, networked imaging device 140, one or more supply chain entities 150, and computer 160 and made available to one or more associated users of PGM anomaly detection system 110, archiving system 120, one or more planning and execution systems 130, networked imaging device 140, one or more supply chain entities 150, and computer 160 using network 170 or in any other appropriate manner. Those skilled in the art will recognize that the complete structure and operation of a network and other components within supply chain network 100 are not depicted or described. Embodiments may be employed in conjunction with known communications networks and other components.

In accordance with the principles of embodiments described herein, one or more planning and execution systems 130 may generate a supply chain plan. Furthermore, one or more computers 160 associated with the one or more planning and execution systems 130 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on a supply chain plan, the number of items currently in stock at one or more supply chain entities 150, the number of items currently in transit in transportation network 132, a forecasted demand, a supply chain disruption, a material or capacity reallocation, current and projected inventory levels at one or more stocking locations, and/or one or more additional factors described herein. For example, the methods described herein may include the computers receiving product data from automated machinery having at least one sensor and the product data corresponding to an item detected by the automated machinery. The received product data may include an image of the item, an identifier, as described above, and/or product information associated with the item, including, for example, dimensions, texture, estimated weight, and the like. One or more computers 160 associated with the one or more planning and execution systems 130 may also receive, from sensor 140A of networked imaging device 140, a current location of the identified item.

The methods may further include computers 160 looking up the received product data in databases 132B-139B associated with the one or more planning and execution systems 130 to identify the item corresponding to the product data received from automated machinery. Based on the identification of the item, computers 160 may also identify (or alternatively generate) a first mapping in databases 132B-139B, where the first mapping is associated with the current location of the identified item. Computers 160 may also identify a second mapping in databases 132B-139B, where the second mapping is associated with a past location of the identified item. Computers 160 may also compare the first mapping and the second mapping to determine if the current location of the identified item in the first mapping is different than the past location of the identified item in the second mapping. Computers 160 may send instructions to the automated machinery based, as least in part, on one or more differences between the first mapping and the second mapping such as, for example, to locate items to add to or remove from an inventory of or shipment for one or more supply chain entities 150. In addition, or as an alternative, one or more planning and execution systems 130 monitors one or more supply chain constraints of one or more items at one or more supply chain entities 150 and adjusts the orders and/or inventory of one or more supply chain entities 150 at least partially based on one or more supply chain constraints.

Figure 2:
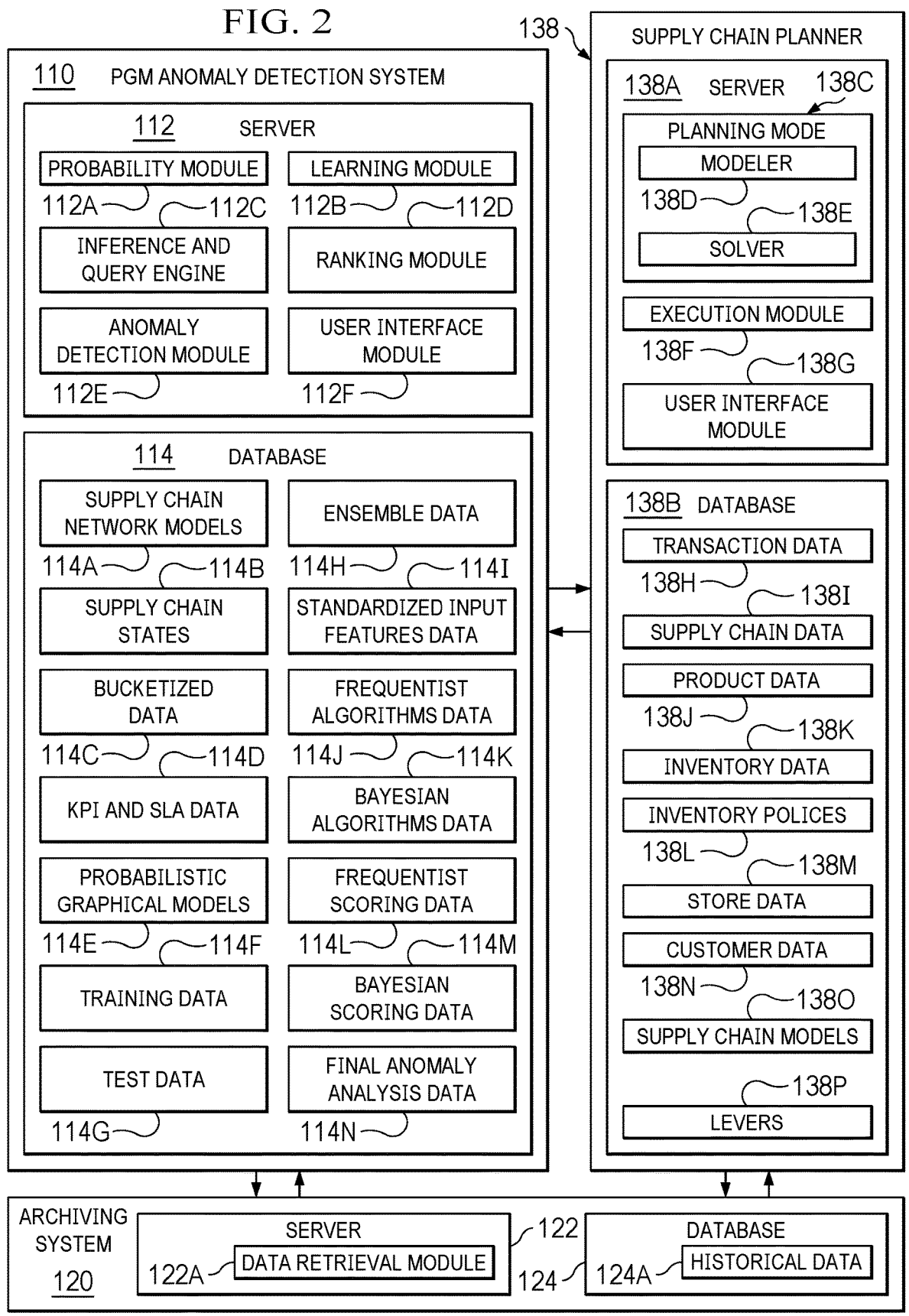
FIG. 2 illustrates the probabilistic graphical model anomaly detection system, the archiving system, and the supply chain planner of FIG. 1 in greater detail, in accordance with an embodiment.

FIG. 2 illustrates PGM anomaly detection system 110, archiving system 120, and supply chain planner 138 of FIG. 1 in greater detail, in accordance with an embodiment. PGM anomaly detection system 110 comprises server 112 and database 114, as described above. Although PGM anomaly detection system 110 is illustrated as comprising a single server 112 and a single database 114, embodiments contemplate any suitable number of servers 112 or databases 114 internal to or externally coupled with PGM anomaly detection system 110.

Server 112 of PGM anomaly detection system 110 comprises probability module 112A, learning module 112B, inference and query engine 112C, ranking module 112D, anomaly detection module 112E, and user interface module 112F. Although server 112 is illustrated and described as comprising a single probability module 112A, a single learning module 112B, a single inference and query engine 112C, a single ranking module 112D, an anomaly detection module 112E, and a single user interface module 112F, embodiments contemplate any suitable number or combination of these located at one or more locations, local to, or remote from PGM anomaly detection system 110, such as on multiple servers or computers at one or more locations in supply chain network 100.

Database 114 may comprise one or more databases or other data storage arrangements at one or more locations, local to, or remote from, server 112. Database 114 comprises, for example, supply chain network models 114A, supply chain states 114B, bucketized data 114C, KPI and SLA data 114D, one or more probabilistic graphical models 114E, training data 114F, test data 114G, ensemble data 114H, standardized input features data 114I, frequentist algorithms data 114J, Bayesian algorithms data 114K, frequentist scoring data 114L, Bayesian scoring data 114M, and final anomaly analysis data 114N. Although database 114 is illustrated and described as comprising supply chain network models 114A, supply chain states 114B, bucketized data 114C, KPI and SLA data 114D, probabilistic graphical models 114E, training data 114F, test data 114G, ensemble data 114H, standardized input features data 114I, frequentist algorithms data 114J, Bayesian algorithms data 114K, frequentist scoring data 114L, Bayesian scoring data 114M, and final anomaly analysis data 114N, embodiments contemplate any suitable number or combination of these, located at one or more locations, local to, or remote from, PGM anomaly detection system 110 according to particular needs.

In one embodiment, probability module 112A constructs a graphical model from supply chain data, such as, for example, supply chain states 114B of database 114, historical data 124A of archiving system 120, data of database 138B (such as, for example, supply chain data or inventory data), and the like. The graphical model may comprise, for example, a Bayesian network. Probability module 112A identifies attributes of the supply chain to represent in the graphical model from the supply chain data and which will be used for the probabilistic graphical model constructed by the learning module 112B, as described in further detail below. By way of example only and not by way of limitation, identified attributes may include inventory stock at a particular location, the current or average volume of orders for a particular product from a particular location, and the like. Probability module 112A may construct a graphical model in which each node represents one of the identified attributes. While constructing the graphical model, probability module 112A may generate edges connecting each node in the graph, with further refinement removing edges when learning module 112B calculates that they do not represent relationships present in the supply chain data.

Learning module 112B refines the graphical model to generate a probabilistic graphical model. Using one or more machine learning algorithms, learning module 112B identifies and models relationships between the nodes of the graphical model. Continuing the example above, when the graphical model is a Bayesian network, learning module 112B calculates the relationships between each node and stores a probability table for each node indicating the probabilistic relationship between related nodes. By way of explanation only and not by way of limitation, consider a simplified graphical model having two nodes, 'A,' and 'B.' If A is related to B, then the probability table for B will indicate the probability that B is true for both the situation that A is true and the situation that A is false. In addition, learning module 112B models probabilistic relationships between the nodes such as conditional probabilities, joint probabilities, and marginal probabilities. According to embodiments, learning module 112B learns the probability of an attribute given the probabilities of one or more related "upstream" attributes. Learning module 112B traverses the network of attribute nodes, and determines the structure of the relationships as well as the associated probabilities.

Inference and query engine 112C evaluates queries against probabilistic graphical model 114E. Inference and query engine 112C responds to queries formulated mathematically, that is, in a format compatible with probabilistic graphical model 114E, such as, for example, query comprising one or more desired states for one or more metrics of the supply chain. Based on the requested desired states, inference and query engine 112C may traverse probabilistic graphical model 114E to determine changes to one or more attributes that would result in an increased probability of reaching the desired states. Inference and query engine 112C may respond to queries with recommendations of modifying the supply chain plan, applying a lever, or adjusting the supply chain to increase the probability of reaching a desired state. In some embodiments, inference and query engine 112C sends recommendations to supply chain planner 138, which automatically modifies the supply chain plan, applies a lever, or adjusts the supply chain to implement the recommendations.

Ranking module 112D of PGM anomaly detection system 110 may, according to embodiments, calculate a score and assign a score-based rank to attributes of the supply chain. According to embodiments, the score-based rank establishes a hierarchy of attributes based, at least in part, on the score. Ranking module 112D may access database 114 and data stored therein, including but not limited to supply chain states 114B, bucketized data 114C, and/or one or more nodes of probabilistic graphical model 114E, in order to establish a hierarchy of relevance to the overall system. In various embodiments, ranking module 112D calculates ranks for the attributes based on historical data 124A of the supply chain, current data of the supply chain, or an ensemble combination of historical and current data of the supply chain. Ranking module 112D may also measure a delta distance for attributes of the supply chain, meaning the distance between the current, or nearly current, state of a particular attribute and a desired or optimal state of that particular attribute. Ranking module 112D may then combine the score-based ranks and the delta distances to arrive at a final ranking for the attributes.

Anomaly detection module 112E may utilize one or more frequentist algorithms 114J and one or more Bayesian algorithms 114K to locate data anomalies and perform other data anomaly detection and weighting actions, as described in greater detail below. According to embodiments, user interface module 112F receives and processes a user input, such as, for example, input received by the input device of one or more computers 160. The one or more computers 160 may transmit input to PGM anomaly detection system 110 using one or more communication links 170A-F.

User interface module 112F may register the input from one or more computers 160 and transmit the input to the modules and engines of PGM anomaly detection system 110. In an embodiment, user interface module 112F generates and displays a user interface (UI), such as, for example, a graphical user interface (GUI), that displays one or more interactive visualizations of data. User interface module 112F may generate one or more GUI displays. The one or more GUI displays may convey information, including supply chain plan data, segmentation data, and/or any other type of information about the supply chain network 100 and segmentation. User interface module 112F may display a GUI dashboard comprising visualizations of the probabilistic graphical model, supply chain data, queries to probabilistic graphical model 114E as well as interactive visual elements that provide for user selection or adjustment of the values of variables to input into PGM anomaly detection system 110, or user entry of queries. In response to input from the user, PGM anomaly detection system 110 may calculate responses to queries including one or more recommendations of changes to be made (on the anomalous variables, as highlighted by PGM anomaly detection system 110) to the supply chain via supply chain planner 138. Further, the dashboard may display results of the query indicating, for example the probability of reaching a desired state of the supply chain currently, and the probability of reaching a desired state of the supply chain if the system recommendations are implemented. As described in further detail below, embodiments of PGM anomaly detection system 110 provide a tool to identify the inputs having the greatest deviation or anomalous behavior as compared to its historical distribution.

Supply chain network models 114A represent the flow of materials through the one or more supply chain entities 150 of the supply chain network 100. As described in more detail below, modeler 138D of planning module 138C of planning and execution system 130 may model the flow of materials through one or more supply chain entities 150 of supply chain network 100 as one or more supply chain network models 114A comprising a network of nodes and edges. The material storage and/or transition units are modelled as nodes, which may be referred to as, for example, buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modelled as edges connecting the nodes. Each edge may represent the flow, transportation, or assembly of materials (such as items or resources) between the nodes by, for example, production processing or transportation. A planning horizon for supply chain network models 114A may be broken down into elementary time-units, such as, for example, time-buckets, or, simply, buckets. The edge between two buffer nodes may denote processing of material and the edge between different buckets for the same buffer may indicate inventory carried forward. Flow-balance constraints for most, if not every buffer in every bucket, model the material movement in the supply chain network 100. Supply chain network models 114A may include any dynamic supply chain data, including for example, the one or more material constraints, one or more capacity constraints, lead times, yield rates, inventory levels, safety stock, demand dates, and/or the like. Although supply chain network models 114A are described as comprising a network of nodes and edges, embodiments contemplate supply chain network models 114A comprising any suitable model that represents one or more components of the supply chain network 100 using any suitable model, according to particular needs.

According to embodiments, supply chain network models 114A may model and display supply chain data stored in database 138B and/or database 124. In an embodiment, supply chain network model 114A may model the flow of materials from upstream nodes to downstream nodes along each of the edges from left to right from, for example, raw materials to finished products. However, flows may be bidirectional, and one or more materials may flow from right to left, from a downstream node to an upstream node. Supply chain network 100 represented by supply chain network model 114A comprises material buffers storing materials or items, operations for processing materials and items, and resources which represent capacity limitations on each of the operations to which they are connected. Operations may have a single material or item as input and a single material or item as output. In addition, or as an alternative, a single operation may require two or more materials or items as input (i.e. materials or items stored at buffers) and produces one or more items as output (materials or items stored at buffers).

Supply chain network 100 represented by supply chain network model 114A may begin at the most upstream nodes representing material buffers, such as, for example, raw material buffers. Raw material buffers may receive the initial input for a manufacturing process. For example, raw materials may comprise metal, fabric, adhesives, polymers, and other materials and compounds required for manufacturing. The flow of materials from the upstream material buffers is indicated by the edges, which identify which of the operations is a possible destination for the materials. For example, raw materials may be transported to operations comprising a production process, such as producing one or more intermediate items from the raw materials which are stored at material buffers comprising, for example, intermediate items buffers. The operations are coupled by the edges with the resources to indicate that the operations require the resource in order to process items or materials. According to embodiments, the resources may include, for example, particular manufacturing, distribution, or transportation equipment and facilities, and other such resources utilized in the supply chain.

Limitations on supplying materials and items to particular buffers may represent transportation limitations (e.g. cost, time, available transportation options) or outputs of various operations (such as, for example, different production processes, which produce different items, each of which may be represented by a different SKU, and which each may be stored at different buffers). Although the limitation of the flow of items between nodes of supply chain network model 114A is described as cost, timing, transportation, or production limitations, embodiments contemplate any suitable flow of items or limitations of the flow of items between any one or more different nodes of a supply chain network 100, according to particular needs. For the example manufacturing supply chain network, transportation processes may transport, package, or ship finished goods to one or more locations internal to or external of one or more supply chain entities 150 of supply chain network 100, including, for example, shipping directly to consumers, to regional or strategic distribution centers, or to the inventory of one or more supply chain entities 150, including, for example, to replenish a safety stock for one or more items in an inventory of one or more supply chain entities 150. Particular items and processes described herein comprise a simplified description for the purpose of illustration. For example, the items may be different sizes, styles, states of same or different physical material. Similarly, a process may be any process or operation, including manufacturing, distribution, transportation, or any other suitable activity of supply chain network 100. In one embodiment, additional constraints, such as, for example, business constraints, operation constraints, and resource constraints, may be added to facilitate other planning rules.

Although a simplified supply chain network model 114A is described as having a particular number of buffers, resources, and operations with a defined flow between them, embodiments contemplate any number of buffers, resources, and operations with any suitable flow between them, including any number of nodes and edges, according to particular needs. In particular, a supply chain planning problem typically comprises supply chain network 100 much more complex than the simplified supply chain network models 114A described above. For example, supply chain network 100 often comprises multiple manufacturing plants located in different regions or countries. In addition, an item may be processed by many operations into a large number of different materials and items, where the different operations may have multiple constrained resources and multiple input items, each with its own lead, transportation, production, and cycle time. In addition, material may flow bidirectionally (either, upstream or downstream).

Supply chain states 114B of database 114A may comprise various metrics and data points representing the current state of the supply chain and historical states of the supply chain. Supply chain states 114B may include data collected from locations of the supply chain such as the stock of inventory at a location, the safety stock of inventory at a location, the total volume of demand for products in the supply chain, the demand at particular product/location combinations in the supply chain, and/or the like. In addition, or as an alternative, supply chain states 114B include various metrics measuring the performance of the supply chain, such as one or more KPIs or SLAs 114D. In other embodiments, the data pertaining to KPIs and SLAs (or other target metrics) may be separately stored as KPI and SLA data 114D. Supply chain states 114B may be used by probability module 112A to construct a graphical model of the supply chain represented by supply chain states 114B.

According to embodiments, data representing supply chain states 114B may be bucketized by probability module 112A and stored as bucketized data 114C. Probability module 112A may bucketize the data based on a functional grouping of the data in supply chain states 114B. For example, probability module 112A may place all data points related to inventory stock into a "stock" bucket. Bucketized data 114C may further have one or more restrictions modeled that prevent data in one bucket having an effect on data in another bucket type. For example, if data is sorted into four temporal buckets (past, current, future, and time-agnostic), then restrictions are included in the model to prevent test data 114G effecting past data and future data effecting current or past data. When using time-bucketized data to construct a probabilistic graphical model, past data nodes will be upstream of test data nodes, and test data nodes will be upstream of future data nodes.

KPI and SLA data 114D may relate to a current or historical state of a supply chain and its performance. KPI and SLA data 114D may also comprise one or more optimal or requested values for one or more features, attributes, other outputs, and/or supply chain entities 150 in the supply chain network 100. According to embodiments, learning module 112B may use KPI and SLA data 114D, in conjunction with supply chain states 114B, to predict the probability of a particular KPI or SLA being attained based on the state of the supply chain. In addition, or in the alternative, learning module 112B creates and/or adjusts the probabilistic graphical model based, at least in part, on the predicted probabilities of attaining particular KPIs or SLAs.

Probabilistic graphical model 114E is, as disclosed above, a graph-based model, such as a Bayesian network, constructed to model the relationship and effect of attributes on the KPIs, SLAs, or other metrics of a supply chain. Probability module 112A may construct a graphical model based on supply chain states 114B, bucketized data 114C, and/or other database 114 data. Learning module 112B refines the graphical model by learning the probabilistic relationships between the nodes to construct probabilistic graphical model 114E. In an embodiment, PGM anomaly detection system 110 uses probabilistic graphical model 114E to respond to queries and make recommendations of changes to the supply chain to improve the probability of meeting one or more desired metrics, such as the KPIs or SLAs.

According to embodiments, probabilistic graphical model 114E may comprise a probabilistic database composed of probability tables for the attributes of supply chain network 100. PGM anomaly detection system 110 may receive one or more queries, and the probabilistic database may respond to the queries by providing one or more insights. According to one embodiment, the query is sent to the probabilistic database. By way of further explanation only and not by way of limitation, the query may, for example, request, when given a first attribute in a first range, and a second attribute desired to be in a second range, the values for one or more other attributes. The response to the query provided by traversing the probabilistic database may be referred to as an inference or an insight into the way supply chain network 100 operates.

Training data 114F is used by probability module 112A and learning module 112B to train probabilistic graphical model 114E. Training data 114F may include data such as supply chain states 114B, bucketized data 114C, KPI and SLA data 114D, or other data related to the supply chain.

Test data 114G is data that is received by PGM anomaly detection system 110 representing a current or near-current state of the supply chain. For example, test data 114G may be received by the PGM anomaly detection system 110, such as via the supply chain planner 138, on a periodic basis. In other embodiments, test data 114G may be received by PGM anomaly detection system 110 as part of a query sent to inference and query engine 112C. Test data 114G may include data such as supply chain states 114B, bucketized data 114C, or other data related to the supply chain.

Ensemble data 114H is a combination of training data 114F and test data 114G, each as disclosed above. According to embodiments, ensemble data 114H provides PGM anomaly detection system 110 with a more accurate representation of relevance of the various attributes than either training data 114F or test data 114G may provide alone. For example, if ranking module 112D uses only training data 114F, the analysis may become static as the supply chain evolves, such as when new locations are added to the supply chain, or when conditions at existing locations change. Thus, a training data-only approach may fail to address recent changes to the supply chain. Test data 114G is by its nature more current than training data 114F is, but typically test data 114G represents a small sample size which would thus be subject to significant noise. The noise may introduce increased uncertainty in a test data-only approach. Further, using such a small sample size may lead to the model overfitting to test data 114G.

When the modeled supply chain network is highly similar to the historical supply chain network, ranking module 112D may use a training data 114F scoring method. In contrast, ranking module 112D may use a test data 114G scoring method may when the changes are instance-based, such as, for example, when given a new row or new data for a production time. In other embodiments, ranking module 112D may use an ensemble data 114H scoring method to attain the benefits of training data 114F and test data 114G, while avoiding the limitations of both.

According to embodiments, the standardized input features data 114I may store standardized data generated by anomaly detection module 112E, drawn from the probabilistic graphical model 114E, supply chain network models 114A, training data 114F, test data 114G, and/or ensemble data 114H.

Frequentist algorithms data 114J may store one or more algorithms that utilize frequentist approaches to analyzing data in order to locate one or more data anomalies within data.

Bayesian algorithms data 114K may store one or more algorithms that utilize Bayesian approaches to analyzing data in order to locate one or more data anomalies within data.

Frequentist scoring data 114L may store anomalous and/or normal scores for a plurality of data points, as assigned by each of one or more frequentist algorithms.

Bayesian scoring data 114M may store anomalous and/or normal scores for a plurality of data points, as assigned by each of one or more Bayesian algorithms.

Final anomaly analysis data 114N may store one or more combined sets of frequentist scoring data 114L and Bayesian scoring data 114M, combined using one or more score weighting processes to generate a final anomaly analysis.

As disclosed above, the archiving system 120 comprises server 122 and database 124. Although the archiving system 120 is illustrated as comprising a single server 122 and a single database 124, embodiments contemplate any suitable number of servers or databases internal to or externally coupled with the archiving system 120.

Server 122 comprises data retrieval module 122A. Although server 122 is illustrated and described as comprising a single data retrieval module 122A, embodiments contemplate any suitable number or combination of data retrieval modules located at one or more locations, local to, or remote from archiving system 120, such as on multiple servers or computers at one or more locations in supply chain network 100.

In one embodiment, data retrieval module 122A receives historical data from the one or more planning and execution systems 130 and the one or more supply chain entities 150 and stores the received historical data in database 124 as historical data 124A. According to one embodiment, data retrieval module 122A may prepare historical data 124A for use by the supply chain planner 138 to generate variants of a supply chain planning problem by checking the historical supply chain data 124A for errors and transforming the historical supply chain data 124A to normalize, aggregate, and/or rescale the historical supply chain data 124A to allow direct comparison of data received from different planning and execution systems 130 and one or more supply chain entities 150 at one or more other locations local to, or remote from, the archiving system 120. According to embodiments, data retrieval module 122A receives data from one or more sources external to the supply chain network 100, such as, for example, weather data, special events data, social media data, calendars, and the like and stores the received data as historical data 124A.

Database 124 may comprise one or more databases or other data storage arrangements at one or more locations, local to, or remote from, server 122. Database 124 comprises, for example, historical data 124A. Although database 124 is illustrated and described as comprising historical data 124A, embodiments contemplate any suitable number or combination of data, located at one or more locations, local to, or remote from, the archiving system 120, according to particular needs.

Historical data 124A is received from PGM anomaly detection system 110, archiving system 120, one or more planning and execution systems 130, one or more supply chain entities 150, computer 160, and/or one or more locations local to, or remote from, supply chain network 100, such as, for example, weather data, special events data, social media data, calendars, and the like. According to one embodiment, historical data 124A comprises historic sales patterns, prices, promotions, weather conditions and other factors influencing demand of one or more items sold in one or more stores over a time period, such as, for example, one or more days, weeks, months, years, including, for example, a day of the week, a day of the month, a day of the year, week of the month, week of the year, month of the year, special events, paydays, and the like. When generating variants of the supply chain planning problem, supply chain planner 138 may calculate supply chain plans over a historical time period, such as, for example, any of the time periods represented by historical data 124A.

As disclosed above, planning and execution system 130 may comprise supply chain planner 138 comprising server 138A and database 138B. Although supply chain planner 138 is illustrated as comprising a single server 138A and a single database 138B, embodiments contemplate any suitable number of servers or databases internal to or externally coupled with the supply chain planner 138.

Server 138A of the supply chain planner 138 comprises planning module 138C, execution module 138F, and user interface module 138G. Although server 138A is illustrated and described as comprising a single planning module 138C, a single execution module 138F, and a single user interface module 138G, embodiments contemplate any suitable number or combination of planning modules 138C, execution modules 138F, and user interface modules 138G, located at one or more locations, local to, or remote from the supply chain planner 138, such as on multiple servers or computers at one or more locations in the supply chain network 100.

Database 138B may comprise one or more databases or other data storage arrangements at one or more locations, local to, or remote from, server 138A. Database 138B comprises, for example, transaction data 138H, supply chain data 138I, product data 138J, inventory data 138K, inventory policies 138L, store data 138M, customer data 138N, supply chain models 138O, and levers 138P. Although database 138B is illustrated and described as comprising transaction data 138H, supply chain data 138I, product data 138J, inventory data 138K, inventory policies 138L, store data 138M, customer data 138N, supply chain models 138O, and levers 138P, embodiments contemplate any suitable number or combination of data, located at one or more locations, local to, or remote from, supply chain planner 138, according to particular needs.

Planning module 138C comprises modeler 138D and solver 138E. Although planning module 138C is illustrated and described as comprising a single modeler 138D and a solver 138E, embodiments contemplate any suitable number or combination of these located at one or more locations, local to, or remote from planning module 138C, such as on multiple servers or computers at any location in the supply chain network 100.

Modeler 138D may model one or more supply chain planning problems of supply chain network 100. According to one embodiment, modeler 138D of server 138A identifies resources, operations, buffers, and pathways, and maps the supply chain network 100 using supply chain network models 114A, as disclosed above. For example, modeler 138D of the server 138A models a supply chain planning problem that represents the supply chain network 100 as a supply chain network model, an LP optimization problem, or other type of input to supply chain solver 138E. As disclosed above, embodiments contemplate modeler 138D providing the supply chain network 100 model to PGM anomaly detection system 110.

According to embodiments, solver 138E of planning module 138C generates a solution to a supply chain planning problem. Supply chain solver 138E may comprise an LP optimization solver, a heuristic solver, a mixed-integer problem solver, a MAP solver, an LP solver, a Deep Tree solver, and the like.

Execution module 138F executes one or more supply chain processes such as, for example, instructing automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on a supply chain plan, the number of items currently in stock at one or more supply chain entities 150, the number of items currently in transit in transportation network 132, a forecasted demand, a supply chain disruption, a material or capacity reallocation, current and projected inventory levels at one or more stocking locations, a selected lever, and/or one or more additional factors described herein. For example, execution module 138F may send instructions to the automated machinery to locate items to add to or remove from an inventory of or shipment for one or more supply chain entities 150.

User interface module 138G of supply chain planner 138 generates and displays a UI, such as, for example, a GUI, that displays one or more interactive visualizations of transaction data 138H, supply chain data 138I, product data 138J, inventory data 138K, inventory policies 138L, store data 138M, customer data 138N, supply chain models 138O, and levers 138. According to embodiments, user interface module 138G displays a GUI comprising interactive graphical elements for selecting one or more supply chain network components, modeling supply chain network 100 as an object model, formulating supply chain network 100 as a supply chain planning problem, solving the supply chain planning problem, displaying predictions from PGM anomaly detection system 110, displaying and providing for selection of one or more levers stored in the supply chain planner levers 138P, and displaying one or more solutions or supply chain plans.

Transaction data 138H may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 138H is represented by any suitable combination of values and dimensions, aggregated or un-aggregated, such as, for example, sales per week, sales per week per location, sales per day, sales per day per season, or the like.

Supply chain data 138I may comprise any data of the one or more supply chain entities 150 including, for example, item data, identifiers, metadata (comprising dimensions, hierarchies, levels, members, attributes, cluster information, and member attribute values), fact data (comprising measure values for combinations of members) of one or more supply chain entities 150. Supply chain data 138I may also comprise for example, various decision variables, business constraints, goals, and objectives of one or more supply chain entities 150. According to some embodiments, supply chain data 138I may comprise hierarchical objectives specified by, for example, business rules, master planning requirements, scheduling constraints, and discrete constraints, including, for example, sequence dependent setup times, lot-sizing, storage, shelf life, and the like.

Product data 138J may comprise products identified by, for example, a product identifier (such as a Stock Keeping Unit (SKU), Universal Product Code (UPC) or the like), and one or more attributes and attribute types associated with the product ID. Product data 138J may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 138K may comprise any data relating to current or projected inventory quantities or states, order rules, or the like. For example, inventory data 138K may comprise the current level of inventory for each item at one or more stocking points across the supply chain network 100. In addition, inventory data 138K may comprise order rules that describe one or more rules or limits on setting an inventory policy, including, but not limited to, a minimum order volume, a maximum order volume, a discount, and a step-size order volume, and batch quantity rules. According to some embodiments, supply chain planner 138 accesses and stores inventory data 138K in database 138B, which may be used by supply chain planner 138 to place orders, set inventory levels at one or more stocking points, initiate manufacturing of one or more components, or the like in response to, and based at least in part on, a supply chain plan or other output of supply chain planner 138. In addition, or as an alternative, inventory data 138K may be updated by receiving current item quantities, mappings, or locations from one or more planning and execution systems 130 and/or networked imaging device 140.

Inventory policies 138L may comprise any suitable inventory policy describing the reorder point and target quantity, or other inventory policy parameters that set rules for the planning and execution system 138 to manage and reorder inventory. Inventory policies 138L may be based on target service level, demand, cost, fill rate, or the like. According to embodiment, inventory policies 138L comprise target service levels that ensure that a service level of one or more supply chain entities 150 is met with a certain probability. For example, one or more supply chain entities 150 may set a service level at 95%, meaning one or more supply chain entities 150 will set the desired inventory stock level at a level that meets demand 95% of the time. Although, a particular service level target and percentage is described; embodiments contemplate any service target or level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, PGM anomaly detection system 110 and/or planning and execution system 138 may determine a replenishment order according to one or more replenishment rules, which, among other things, indicates to one or more supply chain entities 150 to determine or receive inventory to replace the depleted inventory. By way of example and not of limitation, inventory policy 138L for non-perishable goods with linear holding and shorting costs comprises a min./max. (s,S) inventory policy. Other inventory policies 138L may be used for perishable goods, such as fruit, vegetables, dairy, fresh meat, as well as electronics, fashion, and similar items for which demand drops significantly after a next generation of electronic devices or a new season of fashion is released.

Store data 138M may comprise data describing the stores of one or more retailers and related store information. Store data 138M may comprise, for example, a store ID, store description, store location details, store location climate, store type, store opening date, lifestyle, store area (expressed in, for example, square feet, square meters, or other suitable measurement), latitude, longitude, and other similar data. Store data 138M may include demand forecasts for each store indicating future expected demand based on, for example, any data relating to past sales, past demand, purchase data, promotions, events, or the like of one or more supply chain entities 150. The demand forecasts may cover a time interval such as, for example, by the minute, hour, daily, weekly, monthly, quarterly, yearly, or any suitable time interval, including substantially in real time. Although demand forecasts are described as comprising a particular store, the planning and execution system may calculate a demand forecast at any granularity of time, customer, item, region, or the like.

Customer data 138N may comprise customer identity information, including, for example, customer relationship management data, loyalty programs, and mappings between one or more customers and transactions associated with those one or more customers such as, for example, product purchases, product returns, customer shopping behavior, and the like. The customer data may comprise data relating customer purchases to one or more products, geographical regions, store locations, time period, or other types of dimensions.

Supply chain models 1380 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 1380 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model 1380.

Figure 3:
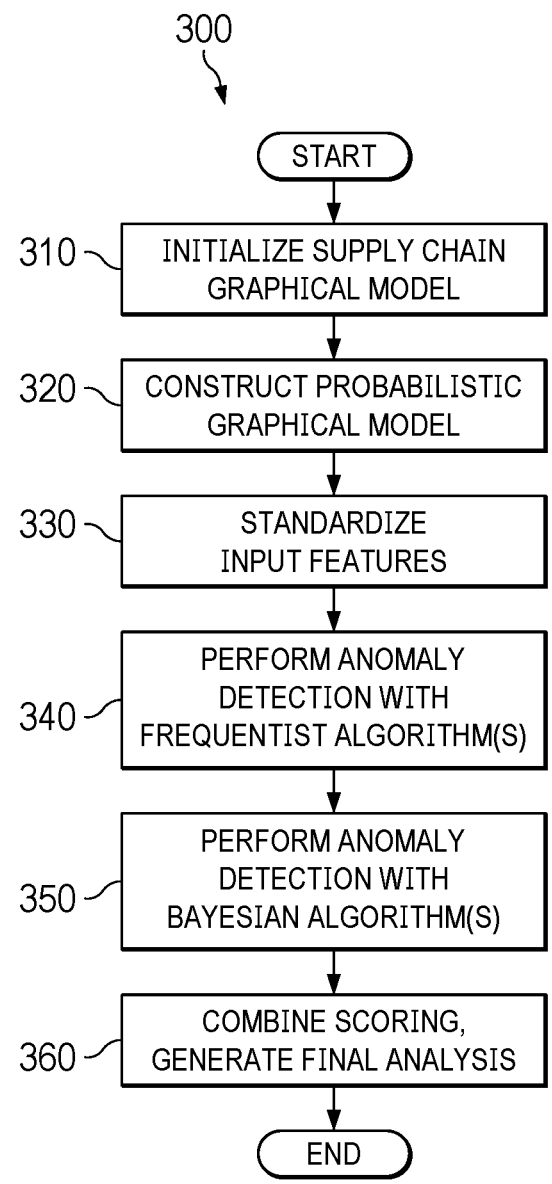
FIG. 3 illustrates a method of detecting anomalies using Bayesian and frequentist anomaly detection algorithms, according to an embodiment.

FIG. 3 illustrates method 300 of detecting anomalies using Bayesian and frequentist anomaly detection algorithms, according to an embodiment. Method 300 comprises one or more actions 310-360, which although described in a particular order may be implemented in one or more combinations, according to particular needs.

At first action 310, probability module 112A and learning module 112B initialize a graphical model of a supply chain. The graphical model may be based on a set of data representing the historical states of the supply chain using training data 114F, such as inventory stock, order volume, distribution center capacity, production ratios, logistical landscapes, and/or other measures, which may be referred to as supply chain attributes and/or supply chain features. Attributes and/or features may vary and correspond to one or more supply chain locations. By way of example only and not by way of limitation, a supply chain location may comprise, for example, one or more supply chain entities 150 (e.g. factories, warehouses, distribution centers, and the like), stocking locations, or any other locations where products may be produced, stored, or transported. In one embodiment, the supply chain data is obtained from supply chain network models 114A of the supply chain planner 138. Embodiments further contemplate the supply chain graphical model comprising a directed graph, such as a Bayesian network. The graphical model may be initialized as a network of nodes, wherein each node corresponds to one or more attributes of the supply chain data and coupled by edges connecting the nodes and emphasizing the relationships between the nodes. Having initialized a graphical model of the supply chain, including supply chain features, probability module 112A and learning module 112D store the graphical model and supply chain features in supply chain network models 114A.

At second action 320, PGM anomaly detection system 110 constructs a probabilistic graphical model by learning the probability relationships between the nodes of the graphical model using training data 114F. Probability module 112A and learning module 112B may access the graphical model stored in supply chain network models 114A and may use the graphical model to construct a probabilistic graphical model. According to embodiments, probability module 112A and learning module 112B determine which features or attributes of the supply chain (each feature or attribute represented by a node of the graphical model) impact other features attributes of the supply chain and the impact on the KPIs, SLAs, and/or other metrics used to measure the performance or productivity of the supply chain. As described above, each node of the probabilistic graphical model is associated with a probability table that describes the edges shared with other nodes and the probability relationship between the nodes. Having constructed the probabilistic graphical model, probability module 112A and learning module 112B store the probabilistic graphical model in probabilistic graphical models 114E of the database.

At third action 330, PGM anomaly detection system 110 standardizes and normalizes probabilistic graphical model input features. In an embodiment, anomaly detection module 112E accesses data stored in probabilistic graphical model 114E, supply chain network models 114A, and/or training data 114F, and generates standardized input features data by standardizing and normalizing the data. Anomaly detection module 112E stores the standardized input features data in the standardized input features data 114I of database 114.

At fourth action 340, PGM anomaly detection system 110 performs anomaly detection on standardized input features data 114I using one or more frequentist algorithms. In an embodiment, one or more frequentist algorithms may comprise one or more algorithms, stored in frequentist algorithms data 114J, that utilize frequentist approaches to analyzing data in order to locate one or more data anomalies within the data. The one or more frequentist algorithms may fit one or more probabilistic models to standardized input features data 114I in order to identify one or more data anomalies within one or more standardized input features data 114I. By way of example only and not by way of limitation, frequentist algorithms may comprise one or more algorithms selected from the list of: an angle-based outlier detector (ABOD) algorithm, a cluster-based local outlier factor (CBLOF) algorithm, a feature bagging algorithm, a histogram-based outlier detection (HBOS) algorithm, a K nearest neighbors (KNN) algorithm, an average KNN algorithm, a local outlier factor (LOF) algorithm, a minimum covariance determinant (MCD) algorithm, a one-class SVM (OCSVM) algorithm, and a principal component analysis (PCA) algorithm.

Anomaly detection module 112E may access one or more frequentist algorithms stored in frequentist algorithms data 114J, and may apply the standardized input features data 114I, and/or training data 114F, test data 114G, and/or ensemble data 114H, to each of the one or more frequentist algorithms. Each frequentist algorithm may score each data point within the set of data applied to the algorithm as either "anomalous" or "normal," according to the criteria of each frequentist algorithm. Each frequentist algorithm may use any cutoff threshold to assess whether a particular data point is normal or anomalous, including but not limited to a 90% cutoff or a 99% cutoff, according to the parameters of the particular frequentist algorithm. Anomaly detection module 112E stores the anomalous and/or normal score for each data point, as assigned by each of the one or more frequentist algorithms, in frequentist scoring data 114L.

At fifth action 350, PGM anomaly detection system 110 performs anomaly detection on the standardized input features data 114*i* using one or more Bayesian algorithms. In an embodiment, one or more Bayesian algorithms may comprise one or more algorithms, stored in Bayesian algorithms data 114K, that utilize Bayesian approaches to analyzing data in order to locate one or more data anomalies within the data. The one or more Bayesian algorithms may utilize one or more probabilistic graphical models 114E, including but not limited to one or more Bayesian networks, to (1) identify prior information, (2) based on the prior information, calculate a likelihood that a particular event or data value will occur, and (3) use the calculated likelihood to identify one or more data anomalies within one or more standardized input features data 114I. Anomaly detection module 112E may access one or more Bayesian algorithms stored in Bayesian algorithms data 114K, and may apply standardized input features data 114I, and/or training data 114F, test data 114G, and/or ensemble data 114H, to each of the one or more Bayesian algorithms. Each Bayesian algorithm may score each data point within the set of data applied to the algorithm as either "anomalous" or "normal," according to the criteria of each Bayesian algorithm. Each Bayesian algorithm may use any cutoff threshold to assess whether a particular data point is normal or anomalous, including but not limited to a 90% cutoff or a 99% cutoff, according to the parameters of the particular Bayesian algorithm. Anomaly detection module 112E stores the anomalous and/or normal score for each data point, as assigned by each of the one or more Bayesian algorithms, in Bayesian scoring data 114M.

At sixth action 360, PGM anomaly detection system 110 combines the frequentist and Bayesian scoring using one or more score weighting processes to generate a final anomaly analysis. In an embodiment, anomaly detection module 112E accesses frequentist scoring data 114L and Bayesian scoring data 114M, and combines frequentist scoring data 114L and Bayesian scoring data 114M using one or more weighting processes to generate a final anomaly analysis. In one embodiment, anomaly detection module 112E may assign equal weights to the "anomalous" and "normal" data points assigned by all frequentist and Bayesian algorithms, and may use a majority rule weighting process to generate a final anomaly analysis. For example, in an embodiment in which one Bayesian algorithm and one frequentist algorithm assign an "anomalous" score to a particular data point, and in which one Bayesian algorithm and two frequentist algorithms assign a "normal" score to a particular data point, anomaly detection module 112E may use a majority rule weighting process to assign a final "normal" score to the data point in the final anomaly analysis.

In other embodiments, anomaly detection module 112E may assign weights to the "anomalous" and "normal" data points by using a Jaccard index similarity analysis. In an embodiment, a Jaccard index similarity analysis may utilize a Jaccard index and/or a Jaccard similarity coefficient to analyze the similarity and diversity of two or more sample sets. A Jaccard similarity coefficient may range in value from 0.0 to 1.0, wherein 0.0 indicates the two or more sample sets are completely dissimilar (no shared data points), and 1.0 indicates the two or more sample sets are completely identical. In an embodiment, anomaly detection module 112E calculates Jaccard similarity coefficients for all possible pairings of algorithms, and assigns increased weighting to algorithms that have a higher overall average of Jaccard similarity coefficients. By way of example only and not by way of limitation, in an embodiment comprising four algorithms (Algorithms, A, B, C, and D), anomaly detection module 112E may calculate Jaccard similarity coefficients for the combinations of algorithms A and B, A and C, A and D, B and C, B and D, and C and D. In this example, anomaly detection module 112E calculates the following Jaccard similarity coefficients, illustrated by TABLE 1 below for exemplary purposes only, for each combination of algorithm data points:

TABLE 1

| Combination of Algorithms | Jaccard Similarity Coefficient |
|---|---|
| Algorithms A and B | 0.2 |
| Algorithms A and C | 0.4 |
| Algorithms A and D | 0.9 |
| Algorithms B and C | 0.8 |
| Algorithms B and D | 0.6 |
| Algorithms C and D | 0.5 |

Continuing this example, Algorithm A has an average Jaccard similarity coefficient of 0.5 ((0.2+0.4+0.9)/3), Algorithm B has an average Jaccard similarity coefficient of 0.53, Algorithm C has an average Jaccard similarity coefficient of 0.56, and Algorithm D has an average Jaccard similarity coefficient of 0.66. In this example, anomaly detection module 112E may assign the greatest weight to the "normal" and "anomalous" data point scoring provided by Algorithm D due to Algorithm D having the highest average Jaccard similarity coefficient, and the least amount of weight to the "normal" and "anomalous" data point scoring provided by Algorithm A, having the lowest average Jaccard similarity coefficient. Other embodiments may use any weighting method to utilize Jaccard similarity coefficients to assign weights to "anomalous" and "normal" data points generated by two or more algorithms. Having combined the frequentist and Bayesian scoring using one or more score weighting processes to generate a final anomaly analysis, anomaly detection module 112E stores the final anomaly analysis in final anomaly analysis data 114N and terminates the method.

To illustrate the actions of PGM anomaly detection system 110 executing the actions of method 300, the following example is provided. In this example, PGM anomaly detection system 110 executes the actions the method 300 to weight and combine the anomaly detection results of ten frequentist algorithms and one Bayesian algorithm via majority weighting. Although the provided example illustrates PGM anomaly detection system 110 executing the actions of method 300 in a particular order, embodiments not illustrated by the provided example contemplate PGM anomaly detection system 110 executing the actions of the method in any order, according to particular needs.

In this example, at first action 310, PGM anomaly detection system 110 probability module 112A and learning module 112B initialize a graphical model of a supply chain. The graphical model is based on a set of data representing the historical states of the supply chain using training data 114F, including but not limited to inventory stock, order volume, distribution center capacity, production ratios, logistical landscapes, and/or other measures, which may be referred to as supply chain attributes and/or supply chain features. In this example, the supply chain data is obtained from supply chain models 1380 of the supply chain planner 138. The supply chain graphical model comprises a directed graph Bayesian network. The graphical model is initialized as a network of nodes, wherein each node corresponds to one or more features and/or attributes of the supply chain data and coupled by edges connecting the nodes and emphasizing the relationships between the nodes. Having initialized a graphical model of the supply chain, including supply chain features, probability module 112A and learning module 112B store the graphical model and supply chain features in supply chain network models 114A.

Continuing the example, at second action 320, PGM anomaly detection system 110 constructs a probabilistic graphical model by learning the probability relationships between the nodes of the graphical model using training data 114F. Probability module 112A and learning module 112B access the graphical model stored in supply chain network models 114A and use the graphical model to construct a probabilistic graphical model. According to embodiments, probability module 112A and learning module 112B determine which features or attributes of the supply chain (each feature or attribute represented by a node of the graphical model) impact other features attributes of the supply chain and the impact on the KPIs, SLAs, and/or other metrics used to measure the performance or productivity of the supply chain. As described above, each node of the probabilistic graphical model is associated with a probability table that describes the edges shared with other nodes and the probability relationship between the nodes. Having constructed the probabilistic graphical model, probability module 112A and learning module 112B store the probabilistic graphical model in probabilistic graphical models 114E of database 114.

Continuing the example, at third action 330, PGM anomaly detection system 110 standardizes and normalizes probabilistic graphical model input features. In an embodiment, anomaly detection module 112E accesses data stored in probabilistic graphical model 114E, supply chain network models 114A, and/or training data 114F, and generates standardized input features data 114I. In this example, and for illustrative purposes only, the standardized input features data 114I comprises five separate data points. Anomaly detection module 112E stores the standardized input features data 114I and the five separate data points therein in the standardized input features data 114I of the PGM anomaly detection system database 114.

Continuing the example, at fourth action 340, PGM anomaly detection system 110 performs anomaly detection on the standardized input features data 114I using, in this example, the following ten frequentist algorithms: an angle-based outlier detector (ABOD) algorithm, a cluster-based local outlier factor (CBLOF) algorithm, a feature bagging algorithm, a histogram-based outlier detection (HBOS) algorithm, a K nearest neighbors (KNN) algorithm, an average KNN algorithm, a local outlier factor (LOF) algorithm, a minimum covariance determinant (MCD) algorithm, a one-class SVM (OCSVM) algorithm, and a principal component analysis (PCA) algorithm. Anomaly detection module 112E accesses each of the ten frequentist algorithms stored in frequentist algorithms data 114J, and applies the standardized input features data 114I to each of the ten frequentist algorithms. Each frequentist algorithm scores each of the five data points as either "anomalous" or "normal," according to the criteria of each frequentist algorithm. Anomaly detection module 112E stores the anomalous and/or normal score for each of the five data points, as assigned by each of the ten frequentist algorithms, in frequentist scoring data 114L.

Continuing the example, at fifth action 350, PGM anomaly detection system 110 performs anomaly detection on the standardized input features data 114I using an isolation forest Bayesian algorithm. The isolation forest Bayesian algorithm utilizes one or more probabilistic graphical models 114E, including but not limited to one or more Bayesian networks, to (1) identify prior information, (2) based on the prior information, calculate a likelihood that a particular event or data value will occur, and (3) use the calculated likelihood to identify one or more data anomalies within the one or more standardized input features data 114I. Anomaly detection module 112E accesses the isolation forest Bayesian algorithm stored in Bayesian algorithms data 114K, and applies the standardized input features data 114I to the isolation forest Bayesian algorithm. The isolation forest Bayesian algorithm scores each of the five data points as either "anomalous" or "normal," according to the criteria of the isolation forest Bayesian algorithm. Anomaly detection module 112E stores the anomalous and/or normal score for each of the five data points, as assigned by the isolation forest Bayesian algorithm, in Bayesian scoring data 114M.

Continuing the example, at sixth action 360, PGM anomaly detection system 110 combines the frequentist and Bayesian scoring using, in this example, a majority selection weighting processes to generate a final anomaly analysis. In this example, user interface module 112F accesses frequentist scoring data 114L and Bayesian scoring data 114M, and generates an algorithm scoring GUI display 400, illustrated by FIG. 4, to visualize the "normal" and "anomalous" data point scoring for each of the five data points stored in standardized input features data 114I according to each of the eleven total algorithms used in this example.

Figure 4:
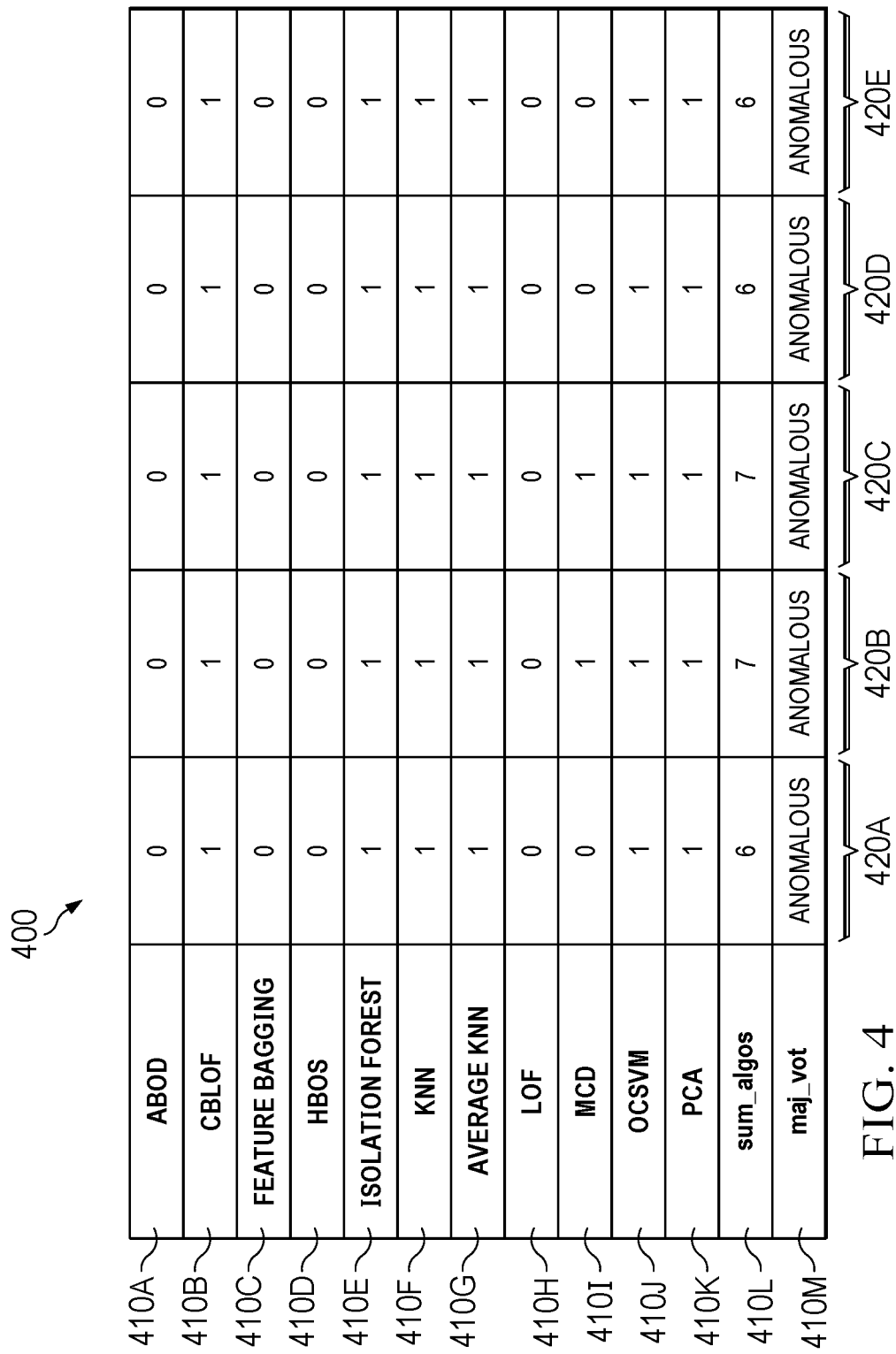
FIG. 4 illustrates an algorithm scoring graphical user interface display, according to an embodiment.

FIG. 4 illustrates algorithm scoring GUI display 400, according to an embodiment. Algorithm scoring GUI display 400 comprises list of the eleven algorithms 410A-K used to evaluate five data points 420A-E stored in standardized input features data 114I (beginning with the frequentist ABOD algorithm 410A, followed by the frequentist CBLOF algorithm 410B, and so on), as well as the "normal" or "anomalous" score that each algorithm has assigned to each of the five data points 420A-E stored in standardized input features data 114I, with 0 in this example representing "normal" and 1 representing "anomalous" (for example, the frequentist ABOD algorithm 410A has scored all five data points 420A-E stored in standardized input features data 114I as "0", indicating "normal"). Although FIG. 4 illustrates algorithm scoring GUI display 400 in a particular configuration, embodiments contemplate PGM anomaly detection system 110 generating algorithm scoring GUI displays 400 in any configuration and displaying any data, according to particular needs.

As illustrated by FIG. 4, the sum_algos row 410L near the bottom of the algorithm scoring GUI display 400 equals the number of algorithms out of the eleven total algorithms that has assigned a 1 or "anomalous" score to each of the five data points 420A-E. Continuing the example, anomaly detection module 112E uses a majority voting weighting process to generate a final anomaly analysis for each of five data points 420A-E. In the majority voting weighting process illustrated by this example, anomaly detection module 112E determines whether a majority of the eleven algorithms (i.e. six of the eleven algorithms) have assigned an "anomalous" score to each of five data points 420A-E, and if a majority of the eleven algorithms have assigned an "anomalous" score for a particular data point, anomaly detection module 112E assigns a final anomaly analysis score of "anomalous" to that data point. Concluding the example, anomaly detection module 112E assigns a final anomaly analysis score of "anomalous" (row 410M) to each of five data points 420A-E, stores the final anomaly analysis in final anomaly analysis data 114N, and terminates method 300.

In the example illustrated by FIG. 4, PGM anomaly detection system 110 uses a majority weighting process to determine whether a given data point of five data points 420A-E is an anomaly. In other examples, PGM anomaly detection system 110 may instead use a Jaccard similarity score process to determine whether a given data point is an anomaly. In such a process, PGM anomaly detection system 110 may apply a weight to each algorithm used to detect anomalies. PGM anomaly detection system 110 may then determine whether the algorithms have collectively met a certain threshold of anomaly detection, where a given algorithm flagging a data point as anomalous may be given as much weight as the algorithm has weight according to its Jaccard similarity score.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been illustrated and described, it will be understood that various changes and modifications to the foregoing embodiments may become apparent to those skilled in the art without departing from the spirit and scope of the present invention.

What is claimed is:

1. A computer-implemented method for applying machine learning to identify anomalous supply chain data, comprising:
    scanning, by a networked imaging device comprising an imaging sensor, one or more items to generate a mapping of the one or more items in a supply chain, wherein the anomalous supply chain data results, at least in part, from the scanning using the imaging sensor;
    generating, by a computer comprising a processor and memory, a probabilistic graphical model, based on supply chain states of the supply chain comprising one or more supply chain entities, to represent a performance of the one or more supply chain entities in the supply chain;
    standardizing, by the computer, input features data related to the probabilistic graphical model;
    performing, with the computer, data anomaly detection within the probabilistic graphical model using one or more frequentist data anomaly detection algorithms;
    performing, with the computer, data anomaly detection within the probabilistic graphical model using one or more Bayesian data anomaly detection algorithms;
    combining, with the computer and according to one or more weighting methods, the data anomaly detection performed using one or more frequentist data anomaly detection algorithms with the data anomaly detection performed using one or more Bayesian data anomaly detection algorithms;
    detecting, with the computer and in response to the combining, an anomaly within the standardized input features data, wherein the anomaly is based, at least in part, on the scanning of the one or more items;
    adjusting, with the computer, the standardized input features data in response to the detection of the anomaly; and
    instructing, with the computer, an automated warehousing system to adjust inventory levels at one or more stocking locations based, at least in part, on the detected anomaly.

2. The computer-implemented method of claim 1, wherein at least one of the one or more frequentist data anomaly detection algorithms comprises a machine-learning-based data anomaly detection algorithm selected from a group consisting of:
    an angle-based outlier detector data anomaly detection algorithm;
    a cluster-based local outlier factor data anomaly detection algorithm;
    a feature bagging data anomaly detection algorithm;
    a histogram-based outlier detection data anomaly detection algorithm;
    a K nearest neighbors (KNN) data anomaly detection algorithm;
    an average KNN data anomaly detection algorithm;
    a local outlier factor data anomaly detection algorithm;
    a minimum covariance determinant data anomaly detection algorithm;
    a one-class support vector machine data anomaly detection algorithm; and
    a principal component analysis data anomaly detection algorithm.

3. The computer-implemented method of claim 1, wherein the one or more weighting methods comprises a Jaccard similarity coefficient weighting method.

4. The computer-implemented method of claim 1, wherein the probabilistic graphical model uses supply chain states, the supply chain states measured by one or more KPI's and SLA's.

5. The computer-implemented method of claim 1, wherein the one or more Bayesian data anomaly detection algorithms and the one or more frequentist data anomaly detection algorithms are scored and combined using a majority rule weighting process to generate a final anomaly analysis of the input features data.

6. The computer-implemented method of claim 1, wherein the historical attributes of a supply chain are normalized, aggregated and rescaled to provide a direct comparison of data received from the one or more supply chain entities.

7. The computer-implemented method of claim 1, wherein each node of the probabilistic graphical model is expressed as a probability table that describes edges shared with other nodes and a probability relationship between nodes.

8. A system for applying machine learning to identify anomalous supply chain data, comprising:
    a networked imaging device and a computer, the computer comprising a processor and memory, the computer configured to:
        scan, by the networked imaging device comprising an imaging sensor, one or more items to generate a mapping of the one or more items in a supply chain, wherein the anomalous supply chain data results, at least in part, from the scanning using the imaging sensor;
        generate a probabilistic graphical model, based on supply chain states of the supply chain comprising one or more supply chain entities, to represent a performance of the one or more supply chain entities in the supply chain;
        standardize input features data related to the probabilistic graphical model;
        perform data anomaly detection within the probabilistic graphical model using one or more frequentist data anomaly detection algorithms;
        perform data anomaly detection within the probabilistic graphical model using one or more Bayesian data anomaly detection algorithms;

combine according to one or more weighting methods, the data anomaly detection performed using one or more frequentist data anomaly detection algorithms with the data anomaly detection performed using one or more Bayesian data anomaly detection algorithms;

detect in response to the combining, an anomaly within the standardized input features data, wherein the anomaly is based, at least in part, on the scan of the one or more items;

adjust the standardized input features data in response to the detection of the anomaly; and instruct an automated warehousing system to adjust inventory levels at one or more stocking locations based, at least in part, on the detected anomaly.

9. The system of claim 8, wherein at least one of the one or more frequentist data anomaly detection algorithms comprises a machine-learning-based data anomaly detection algorithm selected from a group consisting of:
- an angle-based outlier detector data anomaly detection algorithm;
- a cluster-based local outlier factor data anomaly detection algorithm;
- a feature bagging data anomaly detection algorithm;
- a histogram-based outlier detection data anomaly detection algorithm;
- a K nearest neighbors (KNN) data anomaly detection algorithm;
- an average KNN data anomaly detection algorithm;
- a local outlier factor data anomaly detection algorithm;
- a minimum covariance determinant data anomaly detection algorithm;
- a one-class support vector machine data anomaly detection algorithm; and
- a principal component analysis data anomaly detection algorithm.

10. The system of claim 8, wherein the one or more weighting methods comprises a Jaccard similarity coefficient weighting method.

11. The system of claim 8, wherein the probabilistic graphical model uses supply chain states, the supply chain states measured by one or more KPI's and SLA's.

12. The system of claim 8, wherein the one or more Bayesian data anomaly detection algorithms and the one or more frequentist data anomaly detection algorithms are scored and combined using a majority rule weighting process to generate a final anomaly analysis of the input features data.

13. The system of claim 8, wherein the historical attributes of a supply chain are normalized, aggregated and rescaled to provide a direct comparison of data received from the one or more supply chain entities.

14. The system of claim 8, wherein each node of the probabilistic graphical model is expressed as a probability table that describes edges shared with other nodes and a probability relationship between nodes.

15. A non-transitory computer-readable medium embodied with software for applying machine learning to identify anomalous supply chain data, the software when executed:
scans, by a networked imaging device comprising an imaging sensor, one or more items to generate a mapping of the one or more items in a supply chain, wherein the anomalous supply chain data results, at least in part, from the scanning using the imaging sensor;
generates a probabilistic graphical model, based on supply chain states of the supply chain comprising one or more supply chain entities, to represent a performance of the one or more supply chain entities in the supply chain;
standardizes input features data related to the probabilistic graphical model;
performs data anomaly detection within the probabilistic graphical model using one or more frequentist data anomaly detection algorithms;
performs data anomaly detection within the probabilistic graphical model using one or more Bayesian data anomaly detection algorithms;
combines according to one or more weighting methods, the data anomaly detection performed using one or more frequentist data anomaly detection algorithms with the data anomaly detection performed using one or more Bayesian data anomaly detection algorithms;
detects in response to the combining, an anomaly within the standardized input features data, wherein the anomaly is based, at least in part, on the scans of the one or more items;
adjusts the standardized input features data in response to the detection of the anomaly; and
instructs an automated warehousing system to adjust inventory levels at one or more stocking locations based, at least in part, on the detected anomaly.

16. The non-transitory computer-readable medium of claim 15, wherein at least one of the one or more frequentist data anomaly detection algorithms comprises a machine-learning-based data anomaly detection algorithm selected from a group consisting of:
- an angle-based outlier detector data anomaly detection algorithm;
- a cluster-based local outlier factor data anomaly detection algorithm;
- a feature bagging data anomaly detection algorithm;
- a histogram-based outlier detection data anomaly detection algorithm;
- a K nearest neighbors (KNN) data anomaly detection algorithm;
- an average KNN data anomaly detection algorithm;
- a local outlier factor data anomaly detection algorithm;
- a minimum covariance determinant data anomaly detection algorithm;
- a one-class support vector machine data anomaly detection algorithm; and
- a principal component analysis data anomaly detection algorithm.

17. The non-transitory computer-readable medium of claim 15, wherein the one or more weighting methods comprises a Jaccard similarity coefficient weighting method.

18. The non-transitory computer-readable medium of claim 15, wherein the probabilistic graphical model uses supply chain states, the supply chain states measured by one or more KPI's and SLA's.

19. The non-transitory computer-readable medium of claim 15, wherein the one or more Bayesian data anomaly detection algorithms and the one or more frequentist data anomaly detection algorithms are scored and combined using a majority rule weighting process to generate a final anomaly analysis of the input features data.

20. The non-transitory computer-readable medium of claim 15, wherein each node of the probabilistic graphical model is expressed as a probability table that describes edges shared with other nodes and a probability relationship between the nodes.

* * * * *